UNITED STATES PATENT OFFICE.

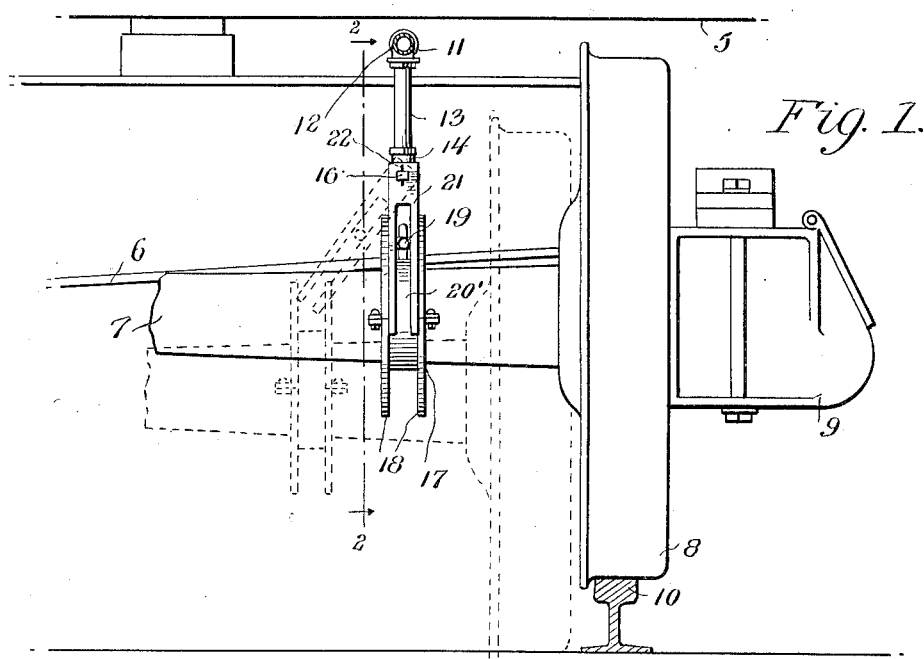
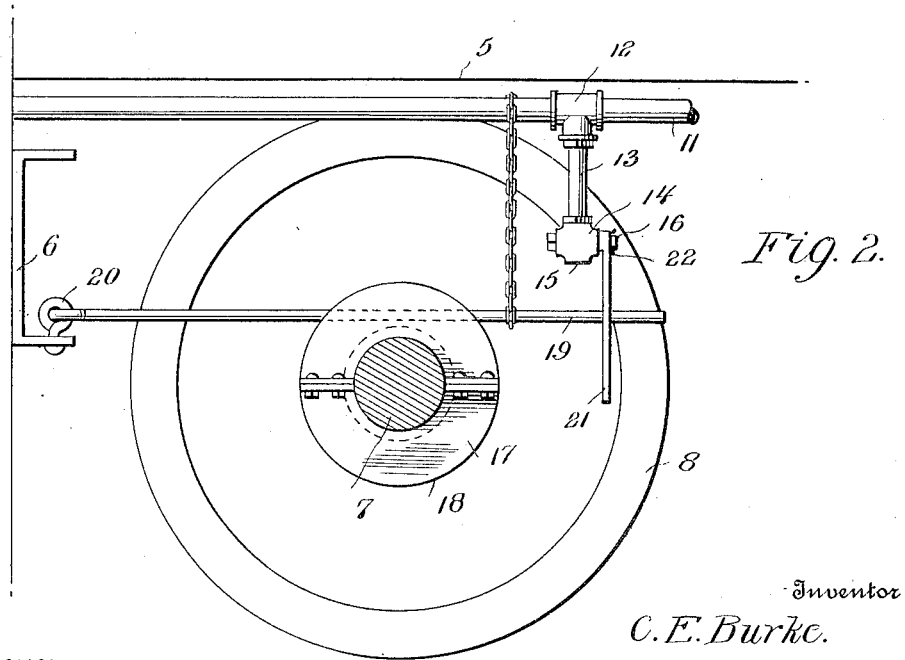

CHARLES E. BURKE, OF ARGENTA, ARKANSAS, ASSIGNOR OF ONE-HALF TO JAMES GERLACH, OF ARGENTA, ARKANSAS.

SAFETY DEVICE.

1,088,528.

Specification of Letters Patent. Patented Feb. 24, 1914.

Application filed July 25, 1913. Serial No. 781,210.

*To all whom it may concern:*

Be it known that I, CHARLES E. BURKE, a citizen of the United States, residing at Argenta, in the county of Pulaski and State of Arkansas, have invented new and useful Improvements in Safety Devices, of which the following is a specification.

The invention relates to a safety device for railway cars, and more particularly to the class of brake applying devices for derailed cars.

The primary object of the invention is the provision of a device of this character wherein on derailment of a car the air brakes will be automatically set, thereby preventing the travel of the car after derailment, the device being of a novel form and is readily and easily applied to a car.

Another object of the invention is the provision of a device of this character which is simple in construction, positive and efficient in its operation, durable, possessing few parts, and also which may be manufactured at a minimum expense.

With these and other objects in view, the invention consists in the construction, combination and arrangement of parts as will be hereinafter fully described, illustrated in the accompanying drawing, and pointed out in the claims hereunto appended.

In the drawing: Figure 1 is a fragmentary end elevation of a car, showing the device applied thereto, the same being illustrated by full lines in normal position and by dotted lines in position for setting the brakes. Fig. 2 is a sectional view on the line 2—2 of Fig. 1, looking in the direction of the arrow.

Similar reference characters indicate corresponding parts throughout the several views in the drawing.

Referring to the drawing by numerals, 5 designates a portion of a box car, 6 a part of the truck, 7 the axle, 8 the car wheels, and 9 the journal boxes for the said axle 7, which are of the ordinary well-known construction, the car wheels being adapted to travel upon the track rails 10 as usual.

Suitably supported beneath the car body 5 is a main air line pipe 11 of an air brake system of any preferred form, and tapped to the said pipe 11 at one side of the car axle 7 is a T-coupling 12 to which is connected a depending branch pipe 13 provided with a valve cock 14 which is formed with an escape nipple 15 communicating with the atmosphere, so that on the turning of the valve plug 16 of the said cock in one direction the air in the train pipe 11 can be bled to the atmosphere for the application of the brakes, the plugs 16 of the valve cocks being controlled by means of the safety appliance device presently described.

The safety appliance or device comprises a split guide pulley or wheel 17, the two parts of which are designed to be fitted and securely fastened about the axle 7 and are fastened together in any suitable manner. Arranged between the spaced peripheral flanges 18 of this pulley or wheel 17 is a valve operating bar or rod 19, one end of which is loosely connected to an eye member 20 fixed in the bolster 6 of the car, while the opposite end of the said bar or rod 19 is engaged in a bifurcated portion 20 of a throw lever or arm 21 which is detachably connected to the valve plug 16, in this instance the said lever or arm 21 being fastened to the plug 16 through the medium of a removable cotter pin 22 which is engaged in the plug in the ordinary well-known manner. However, the said arm or lever 21 can be detachably mounted on the plug in any other suitable manner.

In the operation of the safety appliance, should the car wheels 6 leave the rails 10 of the tracks the axle 7 is shifted laterally as a result thereof, which throws the bar or rod 19 laterally in one direction, thereby rocking or swinging the arm or lever 21 in a direction to turn the plug 16 which opens the valve cock 14, thus permitting the compressed air in the train pipe 11 to escape to the atmosphere and in this manner the brakes on the car are instantly applied. The bifurcated portion of the arm or lever 21 during the movement thereof rides off of the bar or rod 19 so as to avoid breakage of the safety appliance during derailment of the car. When the car has been placed upon the track rails 10 it is necessary to detach the arm or lever 21 from the plug 16 of the valve cock 14 and thereafter engage the bar or rod 19 in the bifurcated portion 20 of the said arm or lever which is then fastened to the plug of the valve cock and is in normal position for subsequent operation in the application of the brakes should the car again become derailed.

From the foregoing it is thought that the construction and manner of operation of the device will be clearly understood, and therefore a more extended explanation has been omitted.

What is claimed is:—

1. A safety device of the class described comprising a guide wheel adapted to be fastened to a car axle, an operating rod engaged in the guide wheel and adapted to be swingingly connected to the bolster of a car, and a valve turning member adapted to be connected to the exhaust valve of an air brake system and engageable with the operating rod, whereby on the swinging of the latter the said member will be moved for the opening of the valve.

2. A safety device of the class described comprising a guide wheel adapted to be fastened to a car axle, an operating rod engaged in the guide wheel and adapted to be swingingly connected to the bolster of a car, a valve turning member adapted to be connected to the exhaust valve of an air brake system and engageable with the operating rod, whereby on the swinging of the latter the said member will be moved for the opening of the valve, the said wheel being formed in two sections, and means for securing the sections together about the car axle.

3. A safety device of the class described comprising a guide wheel adapted to be fastened to a car axle, an operating rod engaged in the guide wheel and adapted to be swingingly connected to the bolster of a car, a valve turning member adapted to be connected to the exhaust valve of an air brake system and engageable with the operating rod, whereby on the swinging of the latter the said member will be moved for the opening of the valve, the said wheel being formed in two sections, means for securing the sections together about the car axle, and means for detachably connecting the member to the turning plug of the exhaust valve.

4. A safety device of the class described comprising a guide wheel adapted to be fastened to a car axle, an operating rod engaged in the guide wheel and adapted to be swingingly connected to the bolster of a car, a valve turning member adapted to be connected to the exhaust valve of an air brake system and engageable with the operating rod, whereby on the swinging of the latter the said member will be moved for the opening of the valve, the said wheel being formed in two sections, means for securing the sections together about the car axle, means for detachably connecting the member to the turning plug of the exhaust valve, and a fork formed on the member and straddling the said rod to permit separation of the member from the rod when the latter swings beyond a predetermined distance.

In testimony whereof I affix my signature in presence of two witnesses.

CHARLES E. BURKE.

Witnesses:
JAMES A. GRAY,
MARTIN A. LALLY.

---

Copies of this patent may be obtained for five cents each, by addressing the "Commissioner of Patents, Washington, D. C."